3,429,238
AUTOMATION OF ENVELOPE MACHINE ADJUSTMENTS
James W. Lenk, Shawnee Mission, Arthur H. Burnett, Prairie Village, and Kenneth D. May, Overland Park, Kans., assignors to Berkley Machine Company, Kansas City, Mo., a corporation of Missouri
Filed Oct. 16, 1967, Ser. No. 675,376
U.S. Cl. 93—61         11 Claims
Int. Cl. B31b *19/00*

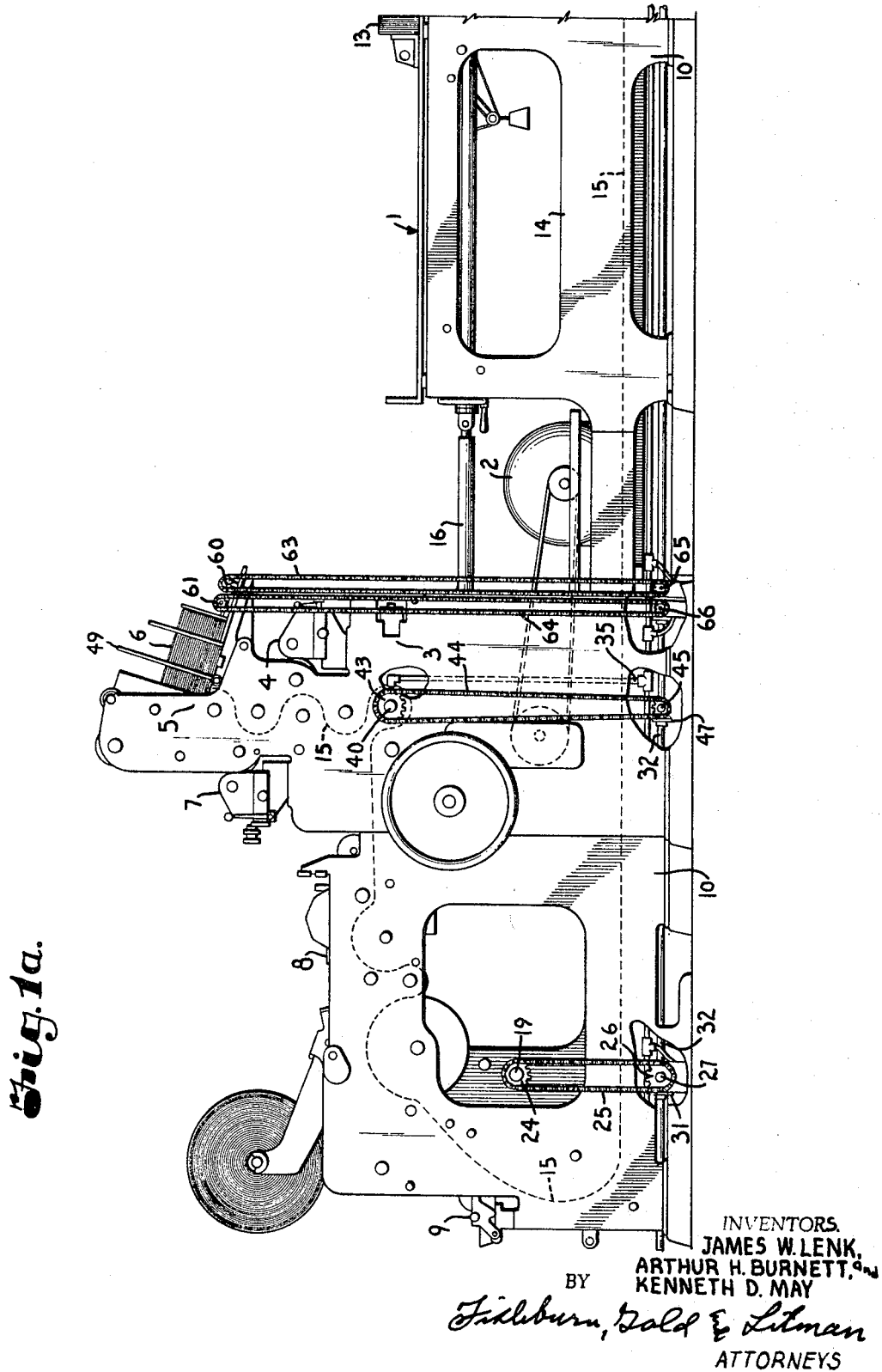

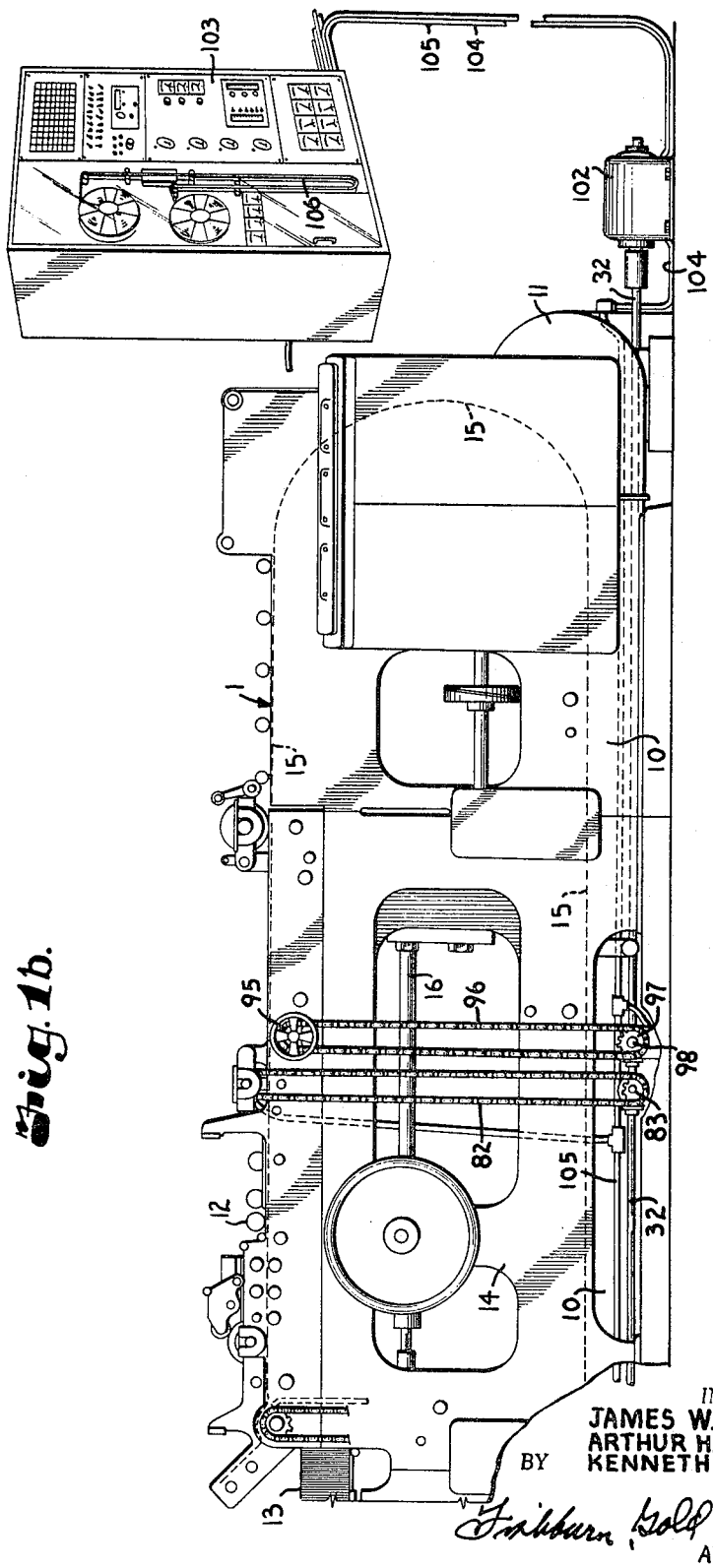

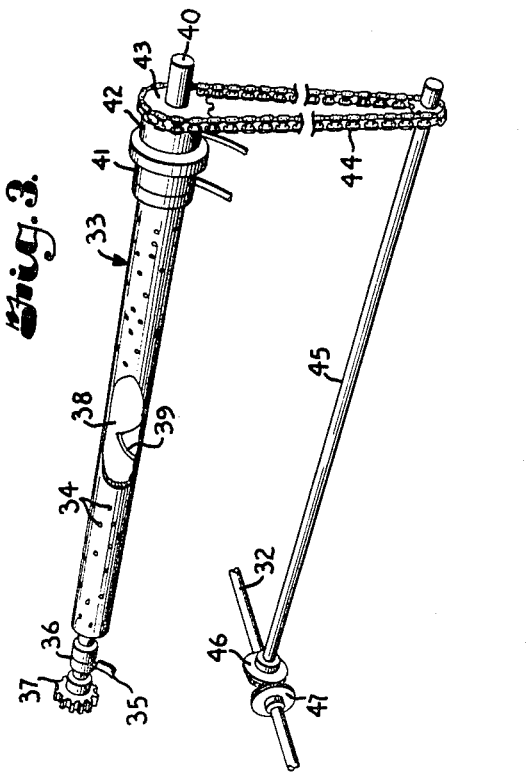
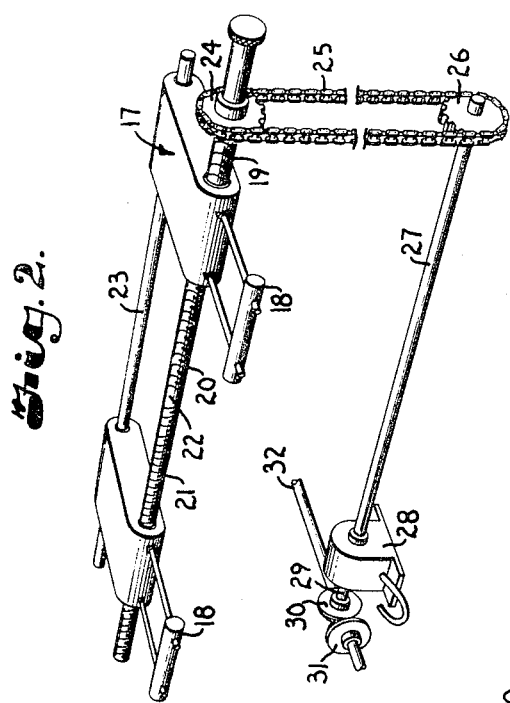
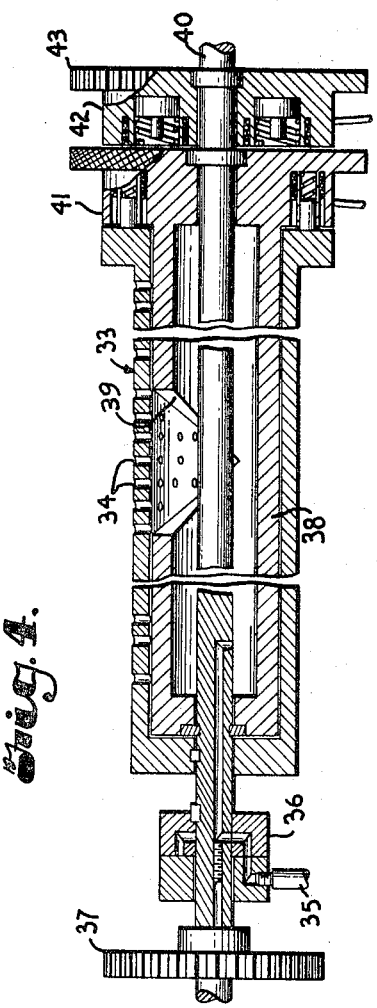

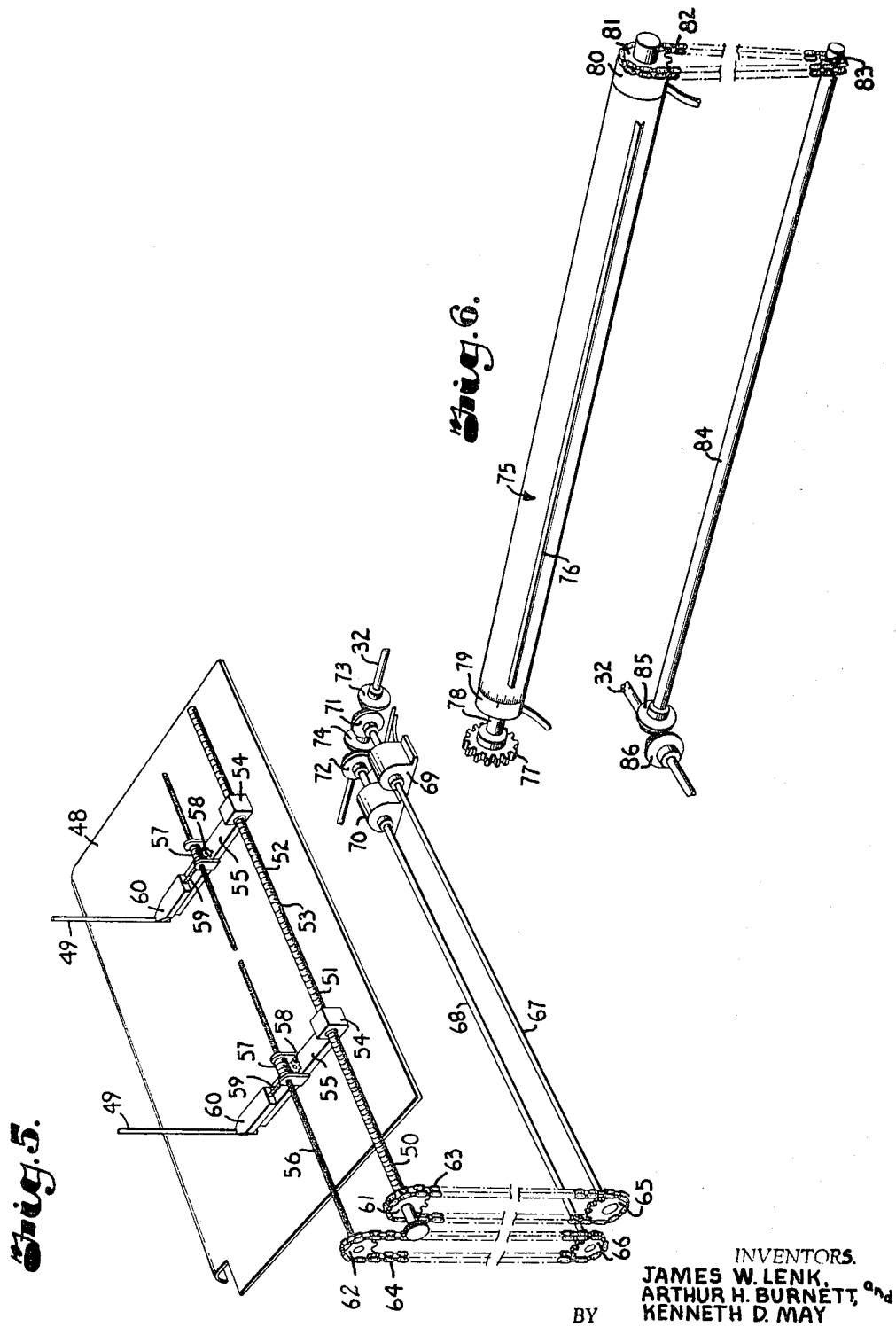

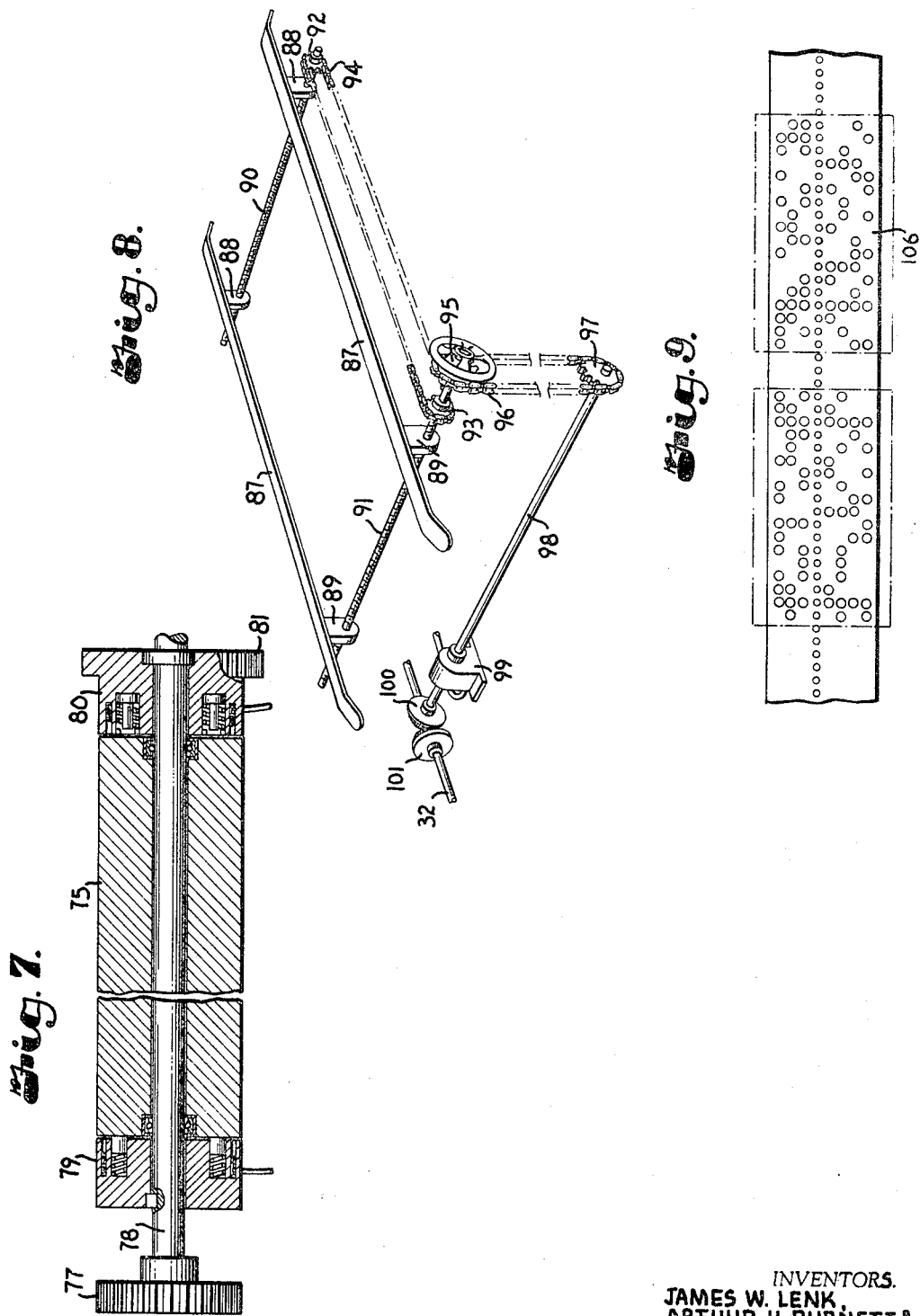

---

ABSTRACT OF THE DISCLOSURE

The adjustable mechanisms of an envelope making machine each have a rotatable adjustment shaft associated therewith which is independent of any normal drive members. A rotatable master shaft extends along the machine and a controlled motion transmitting take-off member is connected between each of the adjustment shafts and the master shaft. The take-off members include electrically operated clutches for selectively engaging and disengaging the master shaft from the adjustment shafts and electrically operated brakes are supplied where necessary for selectively disengaging the normal drive means of the adjustable mechanism during adjustment. A computer is adapted to translate input signals related to blank dimensional changes for the next envelope run to output signals defining corresponding coordinated rotations of a master adjusting motor driving the master shaft, actuations of the clutches and actuations of the brakes.

---

This invention relates to high speed production of envelopes and more particularly to the rapid readjustment of envelope making machines for receiving and operating upon envelope blanks of changed dimensions from the previous run.

Modern envelope making machines are highly complex arrangements which are capable of operating at high speeds while performing a great number of accurate operations on envelope blanks in a predetermined sequence. When it is desired to make dimensional changes in the envelopes produced, it is normally necessary to halt production for conducting an extremely tedious and time consuming adjustment program on the machine. This "down-time" is a significant factor in the costs of finished envelopes and, in recent years, the skilled personnel necessary to effectively perform such readjustments has become increasingly difficult to obtain while the variations in envelopes have multiplied. It is, therefore, of great economic importance to minimize the down-time required for readjustment.

In the practice of this invention, the adjustable mechanisms which sequentially operate on the envelope blanks are not changed in function but are modified so that an adjustment thereof can be performed through the rotation of a shaft which, if necessary, operates in conjunction with structure for releasing the mechanism from its normal drive member during such adjustment. An adjusting member common to many mechanisms, such as a master shaft, is extended along the envelope machine and is connected through respective motion transmitting take-off members to the mechanism adjusting shafts. The take-off members each include an electrically operated clutch adapted to selectively engage and disengage the master shaft from the respective adjustable mechanism shafts and a master adjusting motor is adapted to selectively rotate the master shaft. A computer is provided to translate input signals related to the dimensional changes of the new blank to output signals corresponding to coordinated rotations of the master adjusting motor and actuations of the clutches and brakes. Thus, a large number of mechanism adjustments can be performed sequentially and/or simultaneously without the direct contact with the machine and with a great reduction in time, skilled labor, and the chances of error.

The principal objects of the present invention are: to provide a significant reduction in the time and skill necessary to readjust high speed envelope machines between runs of different size envelope blanks; to provide automated adjusting in envelope making machines wherein highly varied mechanisms are adjusted through the remotely controlled rotation of respective adjusting shafts; to provide such an arrangement which easily conforms to numerical control computer programing; to provide such an arrangement wherein the adjusting members are functionally independent of the normal driving members of the machine; and to provide such an arrangement which renders feasible the use of high speed envelope making machinery on relatively short runs.

Other objects and advantages of this invention will become apparent from the following description taken in connection with the accompanying drawings wherein are set forth by way of illustration and example certain embodiments of this invention.

FIG. 1 (*a* and *b*) is a schematic side elevational view depicting a high speed envelope making machine embodying this invention.

FIG. 2 is a longitudinal cross-sectional view through showing a lateral spacing adjustment mechanism wherein an adjusting shaft includes opposite hand lead screws.

FIG. 3 is a schematic, fragmentary, perspective view showing a transfer mechanism with a vacuum hole adjustment.

FIG. 4 is a longitudinal cross-sectional view through the mechanism of FIG. 3, on an enlarged scale, showing the relationship between the normal drive member and the adjusting structure.

FIG. 5 is a schematic, fragmentary, perspective view illustrating a corner post retaining mechanism wherein posts are adjusted with respect to each other in two dimensions on a plane.

FIG. 6 is a schematic, fragmentary, perspective view illustrating a scoring mechanism with a rotary position adjustment.

FIG. 7 is a longitudinal cross-sectional view, on an enlarged scale, through the mechanism of FIG. 6 showing the internal relationship between the normal drive member and the adjusting structure.

FIG. 8 is a schematic, fragmentary, perspective view illustrating the lateral adjustment of a pair of elongated parallel runner members.

FIG. 9 is a plan view of a section of punched tape illustrating a typical storage medium for informational data used in practicing this invention.

Referring to the drawings in more detail:

The reference numeral 1 generally indicates a high speed rotary envelope making machine, in this example patterned after apparatus sold under the trademark "Helios,"

type 129DS, by Winkler and Dunnebier, Neuwied-Rhein, West Germany. This machine is described herein as suitably modified to illustrate the practice of this invention. The machine includes a main drive motor 2, window cutting section 3, inking unit 4 for outside printing, blank feed section 5 for feeding envelope blanks 6 into the machine, and an inking unit 7 for inside printing on the blank. The machine 1 also incorporates a window application station 8, seal flap gumming section 9, drying channel 10, heater 11 for the channel 10, folding and sticking section 12 and a delivery station 13 for the finished envelopes.

The machine 1 is constructed on an elongated frame 14 defining a path of travel 15 for the blanks 6. Highly varied envelope blank contacting members are located throughout the machine for advancing the blanks 6 in predetermined relation along the path of travel 15. A plurality of adjustable mechanisms, a few selected examples of which are discussed below, are located in spaced relation along the path of travel 15 for sequentially operating on the blanks. Driving members 16 interconnect many of the respective adjustable mechanisms for coordinating the operations thereof, and are themselves driven by the main motor 2.

The adjustable mechanisms selected for illustration are characterized by having a rotatable shaft associated therewith for effecting adjustments thereof to compensate for dimensional changes in the blanks. Portions of representative adjustable mechanisms are shown in FIGS. 2 to 8 and are discussed below.

Referring to FIG. 2, part of a flap separation mechanism 17 includes a pair of adjustably spaced-apart guides 18. For the practice of this invention the guides 18 are partially mounted on a rotatable shaft 19 having screw threads 20 and 21 of opposite hand extending in opposite directions therealong from an intermediate position 22. The guides 18 respectively engage the threads 20 and 21 on opposite sides of the intermediate position 22 and a slide bar 23 permits lateral movement of the guides with respect to each other while preventing unwanted rotation about the shaft 19. Thus, the rotation of the shaft 19 simultaneously moves the guides in opposite lateral directions. A sprocket 24 is mounted on a free end of the shaft 19 and is engaged with a chain 25 which is, in turn, engaged with a sprocket 26 mounted on a shaft 27. The shaft 27 terminates in a suitable electrically operated clutch 28 which includes an input shaft 29 upon which is supported a bevel gear 30. The bevel gear 30 is enmeshed with a bevel gear 31 mounted on a rotatable master adjusting shaft 32 extending along the frame 14. The rotation of the master shaft 32, when occuring with the actuation of the clutch 28, causes the shaft 27 to rotate resulting in rotation of the shaft 19 and lateral adjustment of the guides 18. However, so long as the clutch 28 remains unactuated, the rotation of the shaft 32 has no effect on the lateral positioning adjustment of the guides 18.

Referring to FIGS. 3 and 4 the illustrated mechanism portion includes a vacuum cylinder 33 for grasping and moving envelope blanks as it rotates. The vacuum cylinder 33 has a plurality of vacuum holes 34 therethrough for retaining blanks thereagainst through certain angular positions. A vacuum hose 35 draws a vacuum in the hollow interior of the cylinder 33 through a suitable rotatable joint and valve 36. The cylinder 33 is rotated through through a gear 37 operably connected to one of the driving members 16 when the envelope machine is in normal operation. In order to compensate for varying dimensions in runs of subsequent blanks, selected holes 34 must be blocked or opened. To accomplish this an internal core 38 is located within the vacuum cylinder 33 and has suitable cut-out portions 39 therethrough to provide communication between selected holes 34 and the vacuum hose 35. By rotating the core 38 with respect to the cylinder 33, certain holes 34 are blocked or opened.

The cylinder 33 and core 38 are mounted on a common shaft 40, the cylinder 33 being fixed with respect to the drive gear 37. During machine operation, the core 38 is driven with the cylinder 33 through a normally engaged electric brake 41. An electrically operated clutch 42 is mounted on the shaft 40 adjacent the brake 41 and has a suitable sprocket 43 rotatably fixed thereto. The sprocket 43 engages a chain 44 which, in turn, engages a sprocket on a shaft 45 terminating in a bevel gear 46 which engages a bevel gear 47 mounted on the shaft 32 in spaced relation to the gear 31, Fig. 1a.

In order to change the angular relation between the core 38 and the vacuum cylinder 33, the brake 41 is actuated to release the normally fixed connection between the core and the cylinder and the clutch 42 is actuated to engage the core 38. The cylinder 33 is maintained in a relatively fixed position through the gear 37. The rotation of the shaft 32 during actuation of the brake 41 and clutch 42 will produce a relative rotation between the cylinder 33 and core 38, the degree of rotation being related to the degree of rotation of the shaft 32.

Referring to FIG. 5, the mechanism portion illustrated relates to a feed table 48 having blank engaging corner posts 49. To compensate for variations in blank dimensions, the posts 49 must be adjustable in both directions on the plane of the table 48. To accomplish this a first rotatable shaft 50 is provided having screw threads 51 and 52 of opposite hand extending from a point 53 intermediate the ends of the shaft 50. The threads 51 and 52 are engaged with suitable blocks 54 which are respectively secured to supports 55 for indirectly supporting the corner posts 49. The rotation of the shaft 50 will cause the supports 55 to move laterally with respect to each other and with respect to the intermediate point 53. This causes the corner posts 49 to be symmetrically adjustable transversely of the envelope making machine. For adjustments of the posts longitudinally of the machine a shaft 56 is provided having a longitudinal spline structure slidably engaging screw worms 57. The worms 57 engage suitable gears 58 which are mounted on threaded shafts 59 received in blocks 60 which are slidably mounted on the support 55. When the shaft 56 is rotated, the blocks 60 slide on the supports 55 longitudinally of the envelope making machine, thus producing a longitudinal adjustment of the corner posts 49 carried thereby.

The shafts 50 and 56 respectively have sprockets 61 and 62 fixed thereto and engaging chains 63 and 64 which engage sprockets 65 and 66 mounted on shafts 67 and 68. The shafts 67 and 68 terminate in respective electrically operated clutches 69 and 70 having input shafts carrying bevel gears 71 and 72 which engage bevel gears 73 and 74 mounted on the master shaft 32. Thus the rotation of the shaft 32 coupled with coordinated actuation of the clutches 69 and 70 will result in longitudinal and lateral adjustment of the corner posts 49 as required for a particular change in envelope blank dimensions.

Referring to FIGS. 6 and 7, there is illustrated part of a flap scoring mechanism including a cylinder 75 having a scoring blade 76 which must be adjusted in angular position with respect to the drive gear 77 when the relative position of the score must change due to alterations in envelope blank dimensions. The scoring cylinder 75 is rotatably mounted on a shaft 78 and driven through a normally engaged brake 79 fixed to the shaft 78. An electrically operated clutch 80 is rotatably mounted on the shaft 78 and when actuated engages the cylinder 75 so as to rotate therewith. The clutch 80 includes a sprocket 81 engaging a chain 82 which, in turn, engages a sprocket 83 mounted on a shaft 84 supporting a bevel gear 85 which engages a bevel gear 86 rotatably fixed to the master shaft 32. Thus, by rotating the shaft 32 with the cooperative engagement and disengagement of the brake 79 and clutch 80, the scoring blade 76 may be adjusted to a new angular position with respect to the drive gear 77.

Referring to FIG. 8 there is illustrated a portion of a mechanism which includes a pair of elongated parallel runners 87 which must be adjusted laterally while maintaining a parallel relation to compensate for variations in envelope blank dimensions. To accomplish this the runners 87 have spaced apart mounting blocks 88 and 89 thereon which receive parallel transverse shafts 90 and 91. The shafts 90 and 91 each have screw threads thereon respectively of opposite hand extending in opposite directions from intermediate points and engage the mounting blocks 88 and 89. The shafts 90 and 91 carry sprockets 92 and 93 which are associated by means of a chain 94 whereby they rotate in unison. The shaft 91 also has a sprocket 95 thereon which is engaged with a chain 96, in turn engaged with a sprocket 97. The sprocket 97 is mounted on a shaft 98 terminating in an electrically operated clutch 99 having an input shaft supporting a bevel gear 100 mating with a bevel gear 101 on the master shaft 32. Thus by rotating the shaft 32 with cooperative actuation of the clutch 99, the runners 87 may be moved toward and away from each other while maintaining parallel relation.

A master adjusting motor 102 is engaged with the master shaft 32 and is adapted to rotate the master shaft in either direction with high accuracy as determined by electrical control signals fed thereto.

A signal controlling arrangement is provided, such as a suitable computer 103 adapted to translate input signals, related to blank dimensional changes, to output signals defining corresponding rotations of the master adjusting motor with coordination actuations of the clutches and brakes above described. Electrical conduits 104 and 105 carry the signals from the computer 103 simultaneously to the motor 102 and the respective clutches and brakes to effect the desired adjustments simultaneously and/or sequentially. The signal controlling arrangement is desirably associated also with the control of the main drive motor 2 since, with certain mechanisms such as flap separation mechanism 17, the adjustment is preferably or necessarily made with the envelope machine in operation.

The output control signals, as desired, may be utilized to adjust certain mechanisms to a zero or reference position prior to the new operational setting or merely adjust to the difference from the prior setting. Suitable indicators (not shown) may be provided on the mechanisms to signal the zero setting in the prior case. Also, the clutches noted or other suitable devices (not shown) may be utilized to permit slippage in the adjusting linkage above a certain torque to help insure that the zero position has been reached while avoiding damage to the various parts due to this or any other cause of adjusting motion blockage. Further, hand wheels or knobs may be retained on many of the mechanisms to permit "fine tuning" manually where desirable, for example, due to humidity or stock variations, although such fine tuning may be performed through the adjusting motor if desired. Position location monitoring devices (not shown) may also be utilized to provide information regarding attained position.

Where information coded for computer retrieval is desired for translating input signals to proper output control signals, the information may be stored in any suitable form, for example, on conventional punched tape 106.

It is to be understood that, while certain forms of this invention have been illustrated and described, it is not to be limited thereto, except insofar as such limitations are included in the following claims.

What we claim and desire to secure by Letters Patent is:

1. An envelope making machine adapted to selectively operate on envelope blanks of various dimensions comprising:
   (a) an elongated frame defining a path of travel for said blanks, blank engaging members on said frame for advancing blanks along said path of travel, a plurality of adjustable mechanisms on said frame and located in spaced relation along said path of travel for operating on said blanks, means for driving certain of said adjustable mechanisms,
   (b) said adjustable mechanisms each having movable means associated therewith for effecting adjustments thereof to compensate for dimensional changes in said blanks,
   (c) connecting means extending along said frame, said connecting means including motion transmitting take-off members connected to each of said movable means, said take-off members each including a remotely operable clutch adapted to selectively engage and disengage said connecting means with said respective movable means,
   (d) adjusting motor means engaged with said connecting means for moving said respective movable means upon activation of said clutches,
   (e) control means adapted to translate input signals related to blank dimensional changes to control signals defining coordinated movements of said adjusting motor means and actuations of said clutches, and
   (f) signal transmitting means connecting said control means to said adjusting motor means and respective clutches.

2. The machine as set forth in claim 1 wherein:
   (a) said adjustable mechanism movable means includes a rotatable shaft.

3. The machine as set forth in claim 1 wherein:
   (a) said connecting means includes an elongated rotatable shaft.

4. The machine as set forth in claim 1 wherein:
   (a) said remotely operable clutch is electrically operated.

5. The machine as set forth in claim 1 wherein:
   (a) said adjusting motor means is a single master adjusting motor.

6. The machine as set forth in claim 1 wherein:
   (a) at least one of said adjustable mechanisms is adapted for rotation during machine operation and is rotated by said driving means, and including;
   (b) a remotely operable brake functionally located between said driving means and at least part of said one adjustable mechanism for selectively releasing said part from said driving means,
   (c) said control means being further adapted to translate input signals related to blank dimensional changes to control signals defining coordinated actuations of said brake, and
   (d) said signal transmitting means is additionally connected between said control means and said brake.

7. The machine as set forth in claim 2 wherein:
   (a) the shaft of at least one of said adjustable mechanisms has screw threads thereon of opposite hand for simultaneously translating a plurality of parts upon rotation of said last named shaft.

8. The machine as set forth in claim 7 wherein:
   (a) said one mechanism has two of said last named shafts, and
   (b) means connecting said two shafts together for simultaneous rotation.

9. The machine as set forth in claim 6 wherein:
   (a) said one adjustable meachnism comprises a vacuum cylinder assembly including a cylinder perforated with a plurality of vacuum holes, and
   (b) said adjustable mechanism part is a vacuum hole blocking core in said cylinder.

10. The machine as sest forth in claim 6 wherein:
    (a) said adjustable mechanism part is a cylinder normally fixed with respect to said driving means.

11. The machine as set forth in claim 2 wherein:
(a) at least one of said adjustable members includes a pair of said last named shafts,
(b) one shaft of said pair having screw threads thereon for adjustment therealong,
(c) the other shaft of said pair having at least one gear rotatably fixed and longitudinally slidable thereon, and
(d) means engaging said screw threads and said gear for providing adjustment in two directions.

References Cited

UNITED STATES PATENTS

| 3,052,011 | 9/1962 | Brainard et al. | |
| 3,186,316 | 6/1965 | Lenk | 93—62 |
| 3,259,958 | 7/1966 | Lemelson. | |
| 3,379,103 | 4/1968 | Treff | 93—62 |

BERNARD STICKNEY, *Primary Examiner.*